US005788877A

United States Patent [19]
Shiflett

[11] Patent Number: 5,788,877
[45] Date of Patent: Aug. 4, 1998

[54] SUBSTANTIALLY CONSTANT BOILING COMPOSITIONS OF DIFLUOROMETHANE AND TRIFLUOROETHANE

[75] Inventor: Mark Brandon Shiflett, Newark, Del.

[73] Assignee: E. I. du Pont de Nemours and Company, Wilmington, Del.

[21] Appl. No.: 854,925

[22] Filed: May 13, 1997

Related U.S. Application Data

[63] Continuation of Ser. No. 301,144, Aug. 31, 1994, abandoned, which is a continuation of Ser. No. 26,338, Mar. 4, 1993, abandoned, which is a continuation of Ser. No. 767,847, Sep. 30, 1991, Pat. No. 5,232,618.

[51] Int. Cl.$^6$ .................................................. C09K 5/04
[52] U.S. Cl. .......................... 252/67; 252/305; 252/364; 264/DIG. 5; 510/408; 521/98; 521/131
[58] Field of Search ............................ 510/408, 410; 252/67, 305, 364; 62/114; 521/98, 131; 264/53, DIG. 5

[56] References Cited

U.S. PATENT DOCUMENTS

| | | | |
|---|---|---|---|
| 3,173,872 | 3/1965 | Broadley et al. | 252/172 |
| 3,418,242 | 12/1968 | Eiseman | 252/67 |
| 3,470,101 | 9/1969 | Broadley | 252/67 |
| 4,170,564 | 10/1979 | Brendle | 252/68 |
| 4,174,295 | 11/1979 | Bargigin et al. | 252/305 |
| 4,369,120 | 1/1983 | Stelz et al. | 252/68 |
| 4,483,154 | 11/1984 | Smeal | 62/305 |
| 4,560,458 | 12/1985 | Ueno et al. | 204/165 |
| 4,582,769 | 4/1986 | Kido et al. | 430/57 |
| 4,618,468 | 10/1986 | Rigler et al. | 264/53 |
| 4,622,825 | 11/1986 | Larue et al. | 62/102 |
| 4,810,403 | 3/1989 | Bivens et al. | 252/67 |
| 4,923,626 | 5/1990 | Tamura et al. | 252/67 |
| 4,943,388 | 7/1990 | Shankland et al. | 252/69 |
| 4,978,467 | 12/1990 | Shankland et al. | 252/69 |
| 5,040,609 | 8/1991 | Dougherty et al. | 169/45 |
| 5,162,381 | 11/1992 | Richard et al. | 264/53 |
| 5,370,811 | 12/1994 | Yoshida et al. | 252/67 |
| 5,403,504 | 4/1995 | Bivens et al. | 252/67 |

FOREIGN PATENT DOCUMENTS

| | | | |
|---|---|---|---|
| 430169 | 6/1991 | European Pat. Off. | 252/67 |
| 430171 | 6/1991 | European Pat. Off. | |
| 451692 | 10/1991 | European Pat. Off. | |
| 448997 | 10/1992 | European Pat. Off. | |
| 509673 | 10/1992 | European Pat. Off. | |
| 1079288 | 3/1989 | Japan | 252/67 |
| 3-170586 | 7/1991 | Japan | |
| 3-170592 | 7/1991 | Japan | |
| 92/16597 | 10/1992 | WIPO | |
| WO 93-06186 | 4/1993 | WIPO | |

OTHER PUBLICATIONS

*Research Disclosure* vol. 146 disclosure No. 14623 Jun. 1976.

Morrison et al., "Azeotropy in refrigerant mixtures", *Int. J. Refrigeration*, vol. 16, No. 2 1993 No month availabe pp. 129–138.

Research Disclosure, vol. 146, disclosure No. 14623, Jun. 1976.

Pannock et al., "The Performance of Chlorine–Free Binary Zeotropic Refrigerant Mixtures in a Heat Pump", U.S. Dept. of Commerce, NISTIR 4748, pp. iii–19, Dec. 1991.

Hadley et al., "The Action of Elementary Fluorine upon Organic Compounds. IX. The Vapor Phase Fluorination of Methane," Journal Amer. Chem. Soc., vol. 62, pp. 3302–3303, 1940., no month available.

Thorp et al., Fluorocarbon Solutions at Low Temperatures. II. The Liquid Mixtures $C_2H_6$–$C_2F_6$, $C_2$–$F_6$–$CHF_3$, $CH_2F_2$–$CHF_3$, $C_2H_6$–$CHF_3$ and Xe–$CHF_3$; pp. 1441–1443, 1956., no month available.

*Primary Examiner*—Christine Skane

[57] ABSTRACT

Substantially constant boiling mixtures of difluoromethane and 1,1,1-trifluoroethane or perfluoroethane are useful as refrigerants, aerosol propellants, heat transfer media, gaseous dielectrics, fire extinguishing agents, and expansion agents for polymers.

1 Claim, No Drawings

SUBSTANTIALLY CONSTANT BOILING COMPOSITIONS OF DIFLUOROMETHANE AND TRIFLUOROETHANE

This is a continuation of application Ser. No. 08/301,144, filed Aug. 31, 1994, now abandoned; which is a continuation of application Ser. No. 08/026,338, filed Mar. 4, 1993, now abandoned; which is a continuation of application Ser. No. 07/767,847, filed on Sep. 30, 1991, now U.S. Pat. No. 5,232,618 issued Aug. 3, 1993.

BACKGROUND OF THE INVENTION

This invention relates to compositions that are mixtures of fluorinated compounds and, more specifically, to mixtures that are substantially constant boiling compositions of difluoromethane and 1,1,1-trifluoroethane or perfluoroethane.

Recently the long-term environmental effects of chlorofluorocarbons have come under substantial scientific scrutiny, because it has been postulated that these materials decompose in the stratosphere under the influence of ultraviolet radiation to release chlorine atoms. Chlorine atoms are theorized to undergo chemical reaction in the stratosphere, which could deplete the stratospheric ozone layer which shields the earth from harmful ultraviolet radiation. A substantial reduction of stratospheric ozone could have a serious deleterious impact on the quality of life on earth. In view of the potential environmental problem associated with stratospheric ozone depletion, there is a need for new materials possessing properties which make them useful substitutes for applications in which chlorofluorocarbons have been used and which are also potentially environmentally safe.

There is a limit to the number of single fluorinated hydrocarbon substances which can be candidates as environmentally safe materials. Mixtures of known materials, however, might be used if the desired combination of properties could be found in a given mixture. Simple mixtures, however, create problems in design and operation of refrigeration and other equipment because of component segregation in both the vapor and liquid phases. To avoid component segregation problems, it is particularly desirable to discover new substantially constant boiling fluorocarbon blends. Such blends would not suffer from component segregation problems. Unfortunately, it is not possible to predict the formation of constant boiling compositions, e.g., azeotropes, thus complicating the search for compositions which possess the desired combination of properties. Accordingly, there is an urgent need for substantially constant boiling compositions that have properties which make them particularly useful as power cycle working fluids, e.g., refrigerants, aerosol propellants, heat transfer media, gaseous dielectrics, fire extinguishing agents, and expansion agents for polymers, such as polyolefins and polyurethanes, that are potentially environmentally safe.

SUMMARY OF THE INVENTION

The present invention is directed to substantially constant boiling compositions of fluorinated compounds comprising difluoromethane (HFC-32) and a fluorinated hydrocarbon selected from the group consisting of 1,1,1-trifluoroethane (HFC-143a) and perfluoroethane (FC-116). The compositions of the present invention that contain 1,1,1-trifluoroethane have a weight ratio of difluoromethane to 1,1,1-trifluoroethane of from about 1:99 to 99:1, usually from about 10:90 to 90:10, preferably 73:27 to 99:1 or 73:27 to 90:10. The compositions that contain perfluoroethane have a weight ratio of difluoromethane to perfluoroethane of from about 1:99 to 37:63, preferably from about 9:91 to 18:82. Especially preferred azeotropic compositions comprise about 78 weight percent difluoromethane and about 22 weight percent 1,1,1-trifluoroethane having a boiling point of about $-17.2°$ C. at about 3448 torr or an azeotrope comprising about 11 weight percent difluoromethane to 89 weight percent perfluoroethane having a boiling point of about $-19.6°$ C. at about 9299 torr.

The compositions of the present invention exhibit a higher vapor pressure than either of its two fluorocarbon components. Substantially constant boiling compositions as used in the present invention means their initial vapor pressure at $25°$ C. does not change by more than 10% after half of the initial mixture has been allowed to evaporate. Thus, the compositions described herein resist component segregation which would seriously diminish their usefulness in the contemplated applications. These substantially constant boiling compositions of this invention that are mixtures of fluorinated compounds are especially useful as power cycle working fluids, e.g., refrigerants, aerosol propellants, heat transfer media, gaseous dielectrics, fire extinguishing agents, and expansion agents for polymers such as polyolefins and polyurethanes.

DETAILED DESCRIPTION OF PREFERRED EMBODIMENTS

The fluorinated compounds used in the compositions of the present invention are mixtures identified in the industry as HFC-32 (difluoromethane) and the fluorinated hydrocarbon HFC-143a (1,1,1-trifluoroethane) or FC-116 (perfluoroethane) in nomenclature conventional in halocarbon technology.

A phase study of various mixtures of difluoromethane and 1,1,1-trifluoroethane or perfluoroethane containing widely different amounts of the fluorocarbons indicates that at constant temperature an azeotrope is formed over the temperature range studied. Further studies for the evaluation of substantially constant boiling compositions containing a wide range of proportions of the fluorocarbon components result in resistance to component fractionation of the mixture so that the compositions are substantially constant boiling at constant temperature. Utilizing the particular fluorocarbon components in the amounts disclosed, quite unexpectedly, illustrates that at a constant temperature of $25°$ C. the change in vapor pressure of the composition even after 50% of the initial composition has been allowed to evaporate does not change more than 10%. The small change in vapor pressure at constant temperature illustrates that the amount of separation and loss of one fluorocarbon component in excess amount that would substantially change the boiling point of the mixture does not occur which makes the compositions especially suitable for the contemplated uses, e.g., refrigerants, aerosol propellants, foaming agents, etc.

In addition, studies have indicated that the novel substantially constant boiling compositions of the present invention exhibit dew and bubble point pressures with small pressure differentials. As is well known in the art, the difference between dew point and bubble point pressures at the same temperature is an indication of the constant boiling or azeotrope-like behavior of mixtures. The pressure differentials demonstrated by the substantially constant boiling fluorocarbon compositions of the present invention are very small when compared with those of several known non-azeotropic compositions.

As is well recognized in this field of technology, there is a range of compositions which contain the same components as the true azeotrope, which not only will exhibit substantially equivalent properties as the true azeotrope for refrigeration and other applications, but which will also exhibit substantially equivalent properties to the true azeotropic compositions in terms of constant boiling characteristics and tendency not to segregate or fractionate on boiling at other temperatures and pressures.

Other fluorohydrocarbons can be added to the substantially constant boiling mixtures of HFC-32 and HFC-143a or FC-116 without changing the azeotrope-like properties of the compositions. Representative fluorohydrocarbons that can be added to the constant boiling mixtures of the present invention include chlorodifluoromethane (HCFC-22), pentafluoroethane (HFC-125), 1,1,2,2-tetrafluoroethane (HFC-134), 1-chloro-1,1,2,2-tetrafluoroethane (HCFC-124a), 1-chloro-1,2,2,2-tetrafluorofluoroethane (HCFC-124), 1,1,1,2,3,3,3-heptafluoropropane (HFC-227ea), 1,1,1,2,2,3,3-heptafluoropropane (HFC-227ca), perfluoropropane (FC-218), 1,1,1,2-tetrafluoroethane (HFC-134a), 1,1-difluoroethane (HFC-152a) and fluoroethane (HFC-161). For example, the substantially constant boiling compositions of difluoromethane and 1,1,1-trifluoroethane can contain up to 90 weight percent pentafluoroethane based on the total weight of the composition.

Additives that are frequently incorporated in the fluorocarbon compositions of the present invention when used, for example, as refrigerants, include conventional lubricants, corrosion inhibitors, stabilizers and dyes used for such purposes.

The fluorocarbon compositions described herein can be used to provide refrigeration by condensing the constant boiling compositions and thereafter evaporating the compositions, e.g., condensate, in the vicinity of a body to be cooled. Further, these compositions can also be used to provide heat, for example, in a heat pump, by evaporating the fluorocarbon composition and thereafter condensing the constant boiling fluorocarbon compositions in the vicinity of a body to be heated.

In addition to refrigeration and heating applications, the novel constant boiling fluorocarbon compositions are useful as aerosol propellants, gaseous dielectrics, fire extinguishing agents, expansion agents for polymers, e.g., polyolefins and polyurethanes, and as power cycle working fluids.

The use of substantially constant boiling compositions of this invention eliminates the problem of component fractionation and handling in system operations, because these fluorocarbon compositions behave substantially as a single substance.

The invention will be more clearly understood by referring to the following Examples illustrating preferred embodiments of the invention where parts are by weight unless otherwise indicated.

EXAMPLE 1

A phase study was made on mixtures of difluoromethane (HFC-32) and 1,1,1-trifluoroethane (HFC-143a) wherein the composition was varied and the vapor pressures measured at a constant temperature of $-17.20°$ C. An azeotropic composition was obtained, as evidenced by the maximum pressure observed, and was identified as follows:

Difluoromethane=about 78 weight percent 1,1,1-Trifluoroethane=about 22 weight percent Vapor pressure=about 3448 torr at $-17.20°$ C.

A phase study shows that at other temperatures the azeotropic composition changes as follows:

(a) Difluoromethane=about 94 weight percent 1,1,1-Trifluoroethane=about 6 weight percent Vapor pressure= about 12768 torr at 25° C.

(b) Difluoromethane=about 99 weight percent 1,1,1-Trifluoroethane=about 1 weight percent Vapor pressure= about 16588 torr at 35° C.

(c) Difluoromethane=about 73 weight percent 1,1,1-Trifluoroethane=about 27 weight percent Vapor pressure= about 901 torr at $-50°$ C.

EXAMPLE 2

A phase study was made on mixtures of difluoromethane (HFC-32) and perfluoroethane (FC-116) wherein the composition was varied and the vapor pressures measured at a constant temperature of $-19.6°$ C. An azeotropic composition was obtained, as evidenced by the maximum vapor pressure observed, and was identified as follows:

Difluoromethane=about 11 weight percent

Perfluoroethane=about 89 weight percent

Vapor pressure=about 9299 torr at $-19.6°$ C.

A phase study shows that at other temperatures the azeotropic composition changes as follows:

(a) Difluoromethane=about 15 weight percent Perfluoroethane=about 85 weight percent Vapor pressure=about 29202 torr at 25° C.

(b) Difluoromethane=about 18 weight percent Perfluoroethane=about 82 weight percent Vapor pressure=about 48231 torr at 50° C.

(c) Difluoromethane=about 9 weight percent Perfluoroethane=about 91 weight percent Vapor pressure=about 3230 torr at $-50°$ C.

EXAMPLE 3

Phase studies were made on the constant boiling fluorocarbon compositions of (a) difluoromethane (HFC-32) and 1,1,1-trifluoroethane (HFC-143a) and (b) difluoromethane (HFC-32) and perfluoroethane (FC-116) to verify minimal fractionation and change in vapor pressure and composition during a vapor phase loss at 25° C., about room temperature. Initial liquid (IQ), final liquid (FQ), initial vapor (0), final vapor (1), vapor pressure and change in vapor pressure from initial vapor pressure were all studied to determine the effects of vapor leakage on both the compositions and the vapor pressure as illustrated below in Tables 1 and 2.

TABLE 1

| Sample | Percent Loss of Mixture | Composition (wt %) HFC-32 | Composition (wt %) HFC-143a | Vapor Pressure (psia) | Vapor Pressure Change (%) |
|---|---|---|---|---|---|
| IQ | 0 | 1.0 | 99.0 | 182.0 | 0 |
| 0 | 0 | 1.5 | 98.5 | 182.0 | 0 |
| 1 | 50 | 1.1 | 98.9 | 181.6 | 0.2 |
| FQ | 50 | 1.1 | 98.9 | 181.6 | 0.2 |
| IQ | 0 | 20.0 | 80.0 | 204.6 | 0 |
| 0 | 0 | 26.6 | 73.4 | 204.6 | 0 |
| 1 | 50 | 21.5 | 78.5 | 200.1 | 2.2 |
| FQ | 50 | 15.9 | 84.1 | 200.1 | 2.2 |
| IQ | 0 | 40.0 | 60.0 | 221.8 | 0 |
| 0 | 0 | 48.2 | 51.8 | 221.8 | 0 |
| 1 | 50 | 42.6 | 57.4 | 217.6 | 1.9 |
| FQ | 50 | 34.5 | 65.5 | 217.6 | 1.9 |
| IQ | 0 | 60.0 | 40.0 | 233.9 | 0 |

TABLE 1-continued

| Sample | Percent Loss of Mixture | Composition (wt %) HFC-32 | HFC-143a | Vapor Pressure (psia) | Vapor Pressure Change (%) |
|---|---|---|---|---|---|
| 0 | 0 | 66.6 | 33.4 | 233.9 | 0 |
| 1 | 50 | 62.5 | 37.5 | 231.5 | 1.0 |
| FQ | 50 | 55.3 | 44.7 | 231.5 | 1.0 |
| IQ | 0 | 80.0 | 20.0 | 241.9 | 0 |
| 0 | 0 | 83.1 | 16.9 | 241.9 | 0 |
| 1 | 50 | 81.3 | 18.7 | 241.2 | 0.3 |
| FQ | 50 | 77.7 | 22.3 | 241.2 | 0.3 |
| IQ | 0 | 99.0 | 1.0 | 246.5 | 0 |
| 0 | 0 | 99.1 | 0.9 | 246.5 | 0 |
| 1 | 50 | 99.0 | 1.0 | 246.5 | 0 |
| FQ | 50 | 98.9 | 1.1 | 246.5 | 0 |

TABLE 2

| Sample | Percent Loss of Mixture | Composition (wt %) HFC-32 | FC-116 | Vapor Pressure (psia) | Vapor Pressure Change (%) |
|---|---|---|---|---|---|
| IQ | 0 | 1.0 | 99.0 | 488.3 | 0 |
| 0 | 0 | 3.7 | 96.3 | 488.3 | 0 |
| 1 | 50 | 0.5 | 99.5 | 458.7 | 6.07 |
| FQ | 50 | 0.1 | 99.9 | 458.7 | 6.07 |
| IQ | 0 | 10.0 | 90.9 | 561.9 | 0 |
| 0 | 0 | 13.7 | 86.3 | 561.9 | 0 |
| 1 | 50 | 12.3 | 87.7 | 555.4 | 1.16 |
| FQ | 50 | 7.0 | 93.0 | 555.4 | 1.16 |
| IQ | 0 | 20.0 | 80.0 | 563.6 | 0 |
| 0 | 0 | 16.1 | 83.9 | 563.6 | 0 |
| 1 | 50 | 16.7 | 83.3 | 561.6 | 0.35 |
| FQ | 50 | 24.1 | 75.9 | 561.6 | 0.35 |
| IQ | 0 | 30.0 | 70.0 | 557.8 | 0 |
| 0 | 0 | 17.4 | 82.6 | 557.8 | 0 |
| 1 | 50 | 19.3 | 80.7 | 540.0 | 3.19 |
| FQ | 50 | 46.5 | 53.5 | 540.0 | 3.19 |
| IQ | 0 | 37.0 | 63.0 | 551.7 | 0 |
| 0 | 0 | 18.1 | 81.9 | 551.7 | 0 |
| 1 | 50 | 22.9 | 77.1 | 499.3 | 9.49 |
| FQ | 50 | 64.8 | 35.2 | 499.3 | 9.49 |

The data in the above Tables indicate that the mixtures of difluoromethane and 1,1,1-trifluoroethane and the mixtures of difluoromethane and perfluoroethane are substantially constant boiling with only a maximum change of 2.2% in the vapor pressure for difluoromethane and 1,1,1-trifluoroethane and only a maximum change of 9.49% for difluoromethane and perfluoroethane, with 50% of the initial mixture evaporated. A mixture can be considered substantially constant boiling if its vapor pressure at 25° C. does not change by more than 10% after 50% of the initial mixture has been lost by, for example, evaporation.

EXAMPLE 4

A phase study was made on the constant boiling fluorocarbon composition of difluoromethane (HFC-32) and 1,1,1-trifluoroethane (HFC-143a) containing varying amounts of pentafluoroethane (HFC-125) to verify minimal fractionation and change in the vapor pressure and composition during vapor phase loss at 25° C., about room temperature. Initial liquid (IQ), final liquid (FQ), initial vapor (0), final vapor (1), vapor pressure and change in vapor pressure from initial vapor pressure were all studied to determine the effects of vapor leakage on both the compositions and the vapor pressure, as illustrated below in Table 3.

TABLE 3

| Sample | Percent Loss of Mixture | Composition (wt %) HFC-32 | HFC-125 | HFC-143a | Vapor Pressure (psia) | Vapor Pressure Change (%) |
|---|---|---|---|---|---|---|
| IQ | 0 | 5.0 | 5.0 | 90.0 | 187.6 | 0 |
| 0 | 0 | 7.2 | 5.0 | 87.8 | 187.6 | 0 |
| 1 | 50 | 5.3 | 5.0 | 89.7 | 185.9 | 0.9 |
| FQ | 50 | 3.7 | 4.9 | 91.4 | 185.9 | 0.9 |
| IQ | 0 | 10.0 | 5.0 | 85.0 | 193.8 | 0 |
| 0 | 0 | 13.9 | 4.9 | 81.2 | 193.8 | 0 |
| 1 | 50 | 10.7 | 5.0 | 84.3 | 190.9 | 1.5 |
| FQ | 50 | 7.6 | 5.0 | 87.4 | 190.9 | 1.5 |
| IQ | 0 | 10.0 | 10.0 | 80.0 | 194.2 | 0 |
| 0 | 0 | 13.9 | 9.9 | 76.2 | 194.2 | 0 |
| 1 | 50 | 10.7 | 10.1 | 79.2 | 191.3 | 1.5 |
| FQ | 50 | 7.6 | 10.0 | 82.4 | 191.3 | 1.5 |
| IQ | 0 | 10.0 | 40.0 | 50.0 | 197.6 | 0 |
| 0 | 0 | 13.3 | 40.1 | 46.6 | 197.6 | 0 |
| 1 | 50 | 10.7 | 40.3 | 49.0 | 195.0 | 1.3 |
| FQ | 50 | 7.9 | 39.8 | 52.3 | 195.0 | 1.3 |
| IQ | 0 | 10.0 | 70.0 | 20.0 | 204.3 | 0 |
| 0 | 0 | 12.7 | 69.7 | 17.6 | 204.3 | 0 |
| 1 | 50 | 10.6 | 70.2 | 19.2 | 202.0 | 1.1 |
| FQ | 50 | 8.2 | 70.1 | 21.7 | 202.0 | 1.1 |
| IQ | 0 | 10.0 | 85.0 | 5.0 | 209.5 | 0 |
| 0 | 0 | 12.6 | 83.2 | 4.2 | 209.5 | 0 |
| 1 | 50 | 10.6 | 84.7 | 4.7 | 207.5 | 1.0 |
| FQ | 50 | 8.3 | 86.1 | 5.6 | 207.5 | 1.0 |
| IQ | 0 | 5.0 | 90.0 | 5.0 | 203.9 | 0 |
| 0 | 0 | 6.4 | 89.3 | 4.3 | 203.9 | 0 |
| 1 | 50 | 5.3 | 89.9 | 4.8 | 202.7 | 0.6 |
| FQ | 50 | 4.1 | 90.4 | 5.5 | 202.7 | 0.6 |
| IQ | 0 | 30.0 | 5.0 | 65.0 | 214.3 | 0 |
| 0 | 0 | 37.8 | 4.5 | 57.7 | 214.3 | 0 |
| 1 | 50 | 32.2 | 4.9 | 62.9 | 209.7 | 2.1 |
| FQ | 50 | 24.9 | 5.3 | 69.8 | 209.7 | 2.1 |
| IQ | 0 | 30.0 | 25.0 | 45.0 | 216.3 | 0 |
| 0 | 0 | 37.3 | 23.0 | 39.7 | 216.3 | 0 |
| 1 | 50 | 32.1 | 24.5 | 43.4 | 212.1 | 1.9 |
| FQ | 50 | 25.3 | 26.2 | 48.5 | 212.1 | 1.9 |
| IQ | 0 | 30.0 | 45.0 | 25.0 | 219.8 | 0 |
| 0 | 0 | 36.5 | 42.2 | 21.3 | 219.8 | 0 |
| 1 | 50 | 31.9 | 44.4 | 23.7 | 216.1 | 1.7 |
| FQ | 50 | 25.8 | 46.8 | 27.4 | 216.1 | 1.7 |
| IQ | 0 | 30.0 | 65.0 | 5.0 | 226.2 | 0 |
| 0 | 0 | 35.6 | 60.5 | 3.9 | 226.2 | 0 |
| 1 | 50 | 31.7 | 63.8 | 4.5 | 223.4 | 1.2 |
| FQ | 50 | 26.3 | 67.9 | 5.8 | 223.4 | 1.2 |
| IQ | 0 | 50.0 | 5.0 | 45.0 | 228.8 | 0 |
| 0 | 0 | 57.7 | 4.2 | 38.1 | 228.8 | 0 |
| 1 | 50 | 52.7 | 4.7 | 42.6 | 225.5 | 1.4 |
| FQ | 50 | 44.7 | 5.5 | 49.8 | 225.5 | 1.4 |
| IQ | 0 | 50.0 | 25.0 | 25.0 | 231.2 | 0 |
| 0 | 0 | 56.1 | 23.1 | 20.8 | 231.2 | 0 |
| 1 | 50 | 52.5 | 24.0 | 23.5 | 228.3 | 1.3 |
| FQ | 50 | 45.1 | 27.0 | 27.9 | 228.3 | 1.3 |
| IQ | 0 | 50.0 | 45.0 | 5.0 | 236.4 | 0 |
| 0 | 0 | 55.6 | 40.6 | 3.8 | 236.4 | 0 |
| 1 | 50 | 52.0 | 43.5 | 4.5 | 234.5 | 0.8 |
| FQ | 50 | 46.1 | 48.0 | 5.9 | 234.5 | 0.8 |
| IQ | 0 | 70.0 | 5.0 | 25.0 | 238.8 | 0 |
| 0 | 0 | 74.9 | 4.3 | 20.8 | 238.8 | 0 |
| 1 | 50 | 72.0 | 4.7 | 23.3 | 237.3 | 0.6 |
| FQ | 50 | 66.4 | 5.6 | 28.0 | 237.3 | 0.6 |
| IQ | 0 | 70.0 | 25.0 | 5.0 | 242.3 | 0 |
| 0 | 0 | 73.7 | 22.4 | 3.9 | 242.3 | 0 |
| 1 | 50 | 71.4 | 24.0 | 4.6 | 241.5 | 0.3 |
| FQ | 50 | 67.4 | 26.8 | 5.8 | 241.5 | 0.3 |
| IQ | 0 | 90.0 | 5.0 | 5.0 | 245.4 | 0 |
| 0 | 0 | 91.2 | 4.6 | 4.2 | 245.4 | 0 |
| 1 | 50 | 90.4 | 4.9 | 4.7 | 245.2 | 0.1 |
| FQ | 50 | 89.2 | 5.3 | 5.5 | 245.2 | 0.1 |

The data in Table 3 indicate that mixtures of difluoromethane and 1,1,1-trifluoroethane containing widely varying amounts of pentafluoroethane (up to 90 weight percent)

are substantially constant boiling with only a maximum change of 2.1% in the vapor pressure with 50% of the initial mixtures evaporated.

EXAMPLE 5

A phase study was made on the constant boiling fluorocarbon composition of difluoromethane (HFC-32) and 1,1,1-trifluoroethane (HFC-143a) containing varying amounts of 1,2,2,2-tetrafluoroethane (HFC-134a) to verify minimal fractionation and change in vapor pressure and composition during vapor phase loss at 25° C., about room temperature. Initial liquid (IQ), final liquid (FQ), initial vapor (0), final vapor (1), vapor pressure and change in vapor pressure from initial vapor pressure were alls tudied to determine the effects of vapor leakage on both the compositions and the vapor pressure, as illustrated below in Table 4.

TABLE 4

| Sample | Percent Loss of Mixture | Composition (wt %) | | | Vapor Pressure (psia) | Vapor Pressure Change (%) |
|---|---|---|---|---|---|---|
| | | HFC-32 | HFC-143a | HFC-134a | | |
| IQ | 0 | 90.0 | 5.0 | 5.0 | 241.5 | 0 |
| 0 | 0 | 93.8 | 4.4 | 1.8 | 241.5 | 0 |
| 1 | 50 | 92.4 | 4.8 | 2.8 | 238.9 | 1.0 |
| FQ | 50 | 86.9 | 5.4 | 7.7 | 238.9 | 1.0 |
| IQ | 0 | 5.0 | 90.0 | 5.0 | 183.7 | 0 |
| 0 | 0 | 7.2 | 90.2 | 2.6 | 183.7 | 0 |
| 1 | 50 | 5.3 | 91.0 | 3.7 | 180.7 | 1.6 |
| FQ | 50 | 3.7 | 89.4 | 6.9 | 180.7 | 1.6 |
| IQ | 0 | 47.5 | 47.5 | 5.0 | 223.3 | 0 |
| 0 | 0 | 56.6 | 41.6 | 1.8 | 223.3 | 0 |
| 1 | 50 | 51.0 | 46.2 | 2.9 | 217.0 | 2.8 |
| FQ | 50 | 41.2 | 51.2 | 7.6 | 217.0 | 2.8 |
| IQ | 0 | 80.0 | 5.0 | 15.0 | 232.0 | 0 |
| 0 | 0 | 89.6 | 4.5 | 5.9 | 232.0 | 0 |
| 1 | 50 | 85.7 | 4.9 | 9.4 | 224.5 | 3.2 |
| FQ | 50 | 72.6 | 5.3 | 22.1 | 224.5 | 3.2 |
| IQ | 0 | 5.0 | 80.0 | 15.0 | 176.3 | 0 |
| 0 | 0 | 7.2 | 84.6 | 8.2 | 176.3 | 0 |
| 1 | 50 | 5.4 | 83.0 | 11.6 | 170.8 | 3.1 |
| FQ | 50 | 3.7 | 76.1 | 20.2 | 170.8 | 3.1 |
| IQ | 0 | 42.5 | 42.5 | 15.0 | 212.4 | 0 |
| 0 | 0 | 54.0 | 39.8 | 6.2 | 212.4 | 0 |
| 1 | 50 | 46.8 | 43.2 | 10.0 | 201.2 | 5.3 |
| FQ | 50 | 34.8 | 43.5 | 21.7 | 201.2 | 5.3 |
| IQ | 0 | 55.0 | 5.0 | 40.0 | 203.2 | 0 |
| 0 | 0 | 74.6 | 4.9 | 20.5 | 203.2 | 0 |
| 1 | 50 | 63.7 | 5.3 | 31.0 | 185.0 | 9.1 |
| FQ | 50 | 42.2 | 4.9 | 52.9 | 185.0 | 9.1 |
| IQ | 0 | 5.0 | 55.0 | 40.0 | 156.7 | 0 |
| 0 | 0 | 7.7 | 66.7 | 25.6 | 156.7 | 0 |
| 1 | 50 | 5.5 | 60.0 | 34.5 | 146.7 | 6.4 |
| FQ | 50 | 3.4 | 46.5 | 50.1 | 146.7 | 6.4 |
| IQ | 0 | 30.0 | 30.0 | 40.0 | 182.7 | 0 |
| 0 | 0 | 22.4 | 33.1 | 44.5 | 182.7 | 0 |
| 1 | 50 | 34.2 | 32.8 | 33.0 | 165.1 | 9.6 |
| FQ | 50 | 21.3 | 27.2 | 51.5 | 165.1 | 9.6 |

The data in Table 4 indicate that mixtures of difluoromethane and 1,1,1-trifluoroethane containing widely varying amounts of 1,2,2,2-tetrafluoroethane, up to 40 weight percent, are substantially constant boiling with only a maximum change of 9.6% in vapor pressure with 50% of the initial mixture evaporated.

EXAMPLE 6

Evaluation of the refrigeration properties of substantially constant boiling mixtures of difluoromethane (HFC-32) and 1,1,1-trifluoroethane (HCFC-143a) containing pentafluoroethane (HFC-125) are shown in Table 5 and compared with refrigerants (R-502), chlorodifluoromethane (HCFC-22) and pentafluoroethane (HFC-125).

TABLE 5

| | HFC-32/HCFC-143a/HFC-125 | | |
|---|---|---|---|
| | (20/20/60) (wt %) | (10/40/50) (wt %) | (40/10/50) (wt %) |
| Evaporator Temp., °F. | −30.0 | −30.0 | −30.0 |
| Evaporator Pres., psia | 30.4 | 28.9 | 32.6 |
| Condenser Temp., °F. | 115.0 | 115.0 | 115.0 |
| Condenser Pres., psia | 357.5 | 335.0 | 386.1 |
| Return Gas Temp., °F. | 65.0 | 65.0 | 65.0 |
| Subcooling Temp., °F. | 0 | 0 | 0 |
| Compressor Discharge Temp., °F. | 254.0 | 240.0 | 283.0 |
| Coefficient of Performance | 1.80 | 1.83 | 1.80 |
| Capacity (BTU/min) | 98.0 | 92.6 | 108.7 |

| | Commercial Refrigerants | | |
|---|---|---|---|
| | R-502 | HCFC-22 | HFC-125 |
| Evaporator Temp., °F. | −30.0 | −30.0 | −30.0 |
| Evaporator Pres., psia | 24.0 | 19.6 | 26.7 |
| Condenser Temp., °F. | 115.0 | 115.0 | 115.0 |
| Condenser Pres., psia | 282.0 | 257.9 | 327.5 |
| Return Gas Temp., °F. | 65.0 | 65.0 | 65.0 |
| Subcooling Temp.,°F. | 0 | 0 | 0 |
| Compressor Discharge Temp., °F. | 238.8 | 304.4 | 223.1 |
| Coefficient of Performance | 1.89 | 1.97 | 1.69 |
| Capacity (BTU/min) | 80.0 | 76.6 | 79.4 |

Capacity means the change in enthalpy of the refrigerant in the evaporator per round of refrigerant circulated, i.e., the heat removed by the refrigerant in the evaporator per time.

Coefficient of Performance (C.O.P.) is the ratio of net refrigeration effect to the compressor work. It is a measure of refrigeration energy efficiency.

The substantially constant boiling mixtures illustrated in Table 4 are based on a compressor with a 3.5 cubic foot displacement at 100% isoentropic efficiency. As shown in Table 5, the compositions containing a mixture of difluoromethane, 1,1,1-trifluoroethane and pentafluoroethane offer an increase in capacity compared with pentafluoroethane; the discharge temperatures of the mixtures are lower than chlorodifluoromethane which results in potentially longer compressor lifetimes.

I claim:

1. A maximum vapor pressure azeotropic composition consisting essentially of about 73 to about 99 weight percent difluoromethane and about 1 to about 27 weight percent 1,1,1-trifluoroethane wherein the vapor pressure of the composition ranges from about 901 torr at −50° C. for a composition consisting essentially of about 73 weight percent difluoromethane and about 27 weight percent 1,1,1-trifluoroethane to about 16588 torr at 35° C. for a composition consisting essentially of about 99 weight percent difluoromethane and about 1 weight percent 1,1,1-trifluoroethane.

* * * * *